(12) United States Patent
Overhultz et al.

(10) Patent No.: US 8,070,065 B2
(45) Date of Patent: Dec. 6, 2011

(54) DISTRIBUTED ANTENNA ARRAY WITH CENTRALIZED DATA HUB FOR DETERMINING PRESENCE AND LOCATION OF RF TAGS

(75) Inventors: Gary L. Overhultz, River Forest, IL (US); Gordon E. Hardman, Boulder, CO (US); John W. Pyne, Erie, CO (US)

(73) Assignee: Goliath Solutions, LLC, Wilmington, DE (US)

( * ) Notice: Subject to any disclaimer, the term of this patent is extended or adjusted under 35 U.S.C. 154(b) by 883 days.

(21) Appl. No.: 12/115,657

(22) Filed: May 6, 2008

(65) Prior Publication Data
US 2008/0258876 A1      Oct. 23, 2008

Related U.S. Application Data

(63) Continuation of application No. 11/417,768, filed on May 4, 2006, now Pat. No. 7,614,556, which is a continuation-in-part of application No. PCT/US2005/037138, filed on Oct. 18, 2005.

(60) Provisional application No. 60/625,273, filed on Nov. 5, 2004.

(51) Int. Cl.
*G06K 7/08*    (2006.01)
*G06K 19/00*   (2006.01)
*G06F 19/00*   (2011.01)
*G08B 13/14*   (2006.01)

(52) U.S. Cl. ........ 235/451; 235/435; 235/487; 235/385; 340/572.7

(58) Field of Classification Search ............... 340/572.7, 340/572.1, 10.1; 235/451, 435, 487, 385
See application file for complete search history.

(56) References Cited

U.S. PATENT DOCUMENTS
3,906,509 A     9/1975    DuHamel
(Continued)

FOREIGN PATENT DOCUMENTS
WO    2004/086337    10/2004

OTHER PUBLICATIONS
Texas Instruments, UHF Applications Installation Hints, Sep. 2005.

*Primary Examiner* — Daniel Walsh
(74) *Attorney, Agent, or Firm* — Jones Day

(57) ABSTRACT

A distributed antenna array with a centralized data hub for determining the presence and location of RF tags has been disclosed. This antenna array centralizes electronics and distributes the RF to zones in a facility to greatly reduce the expense of recurring components for monitoring RF tags. A single BRT/hub with multiple antennas attached to transmit and receive ports is used to cover an entire facility. Large facilities are covered by a small number of the BRT/hub combinations. The BRT/hub has transmit antennas coupled thereto, preferably by co-axial cable, that transmit signals to a portion or all of the RF tags and all or a portion of them modulate and reflect the RF signal to a particular receiving antenna. The receiving antenna then returns the RF signal with tag data to the BRT/hub, preferably by co-axial cable. Also disclosed is an RF backscatter tag that cleanly switches a resonant aperture antenna on and off, thereby greatly increasing the mark-to-space ratio of the backscatter data. This enables tags to be detected by the BRT at much greater distances.

12 Claims, 10 Drawing Sheets

U.S. PATENT DOCUMENTS

| | | |
|---|---|---|
| 5,287,266 A | 2/1994 | Malec et al. |
| 5,313,216 A | 5/1994 | Wang et al. |
| 5,329,287 A | 7/1994 | Strickland |
| 5,493,107 A | 2/1996 | Gupta et al. |
| 5,572,226 A | 11/1996 | Tuttle |
| 5,612,707 A | 3/1997 | Vaughan et al. |
| 5,719,586 A | 2/1998 | Tuttle |
| 5,771,005 A | 6/1998 | Goodwin |
| 5,793,029 A | 8/1998 | Goodwin |
| 5,872,549 A | 2/1999 | Huynh et al. |
| 5,923,252 A | 7/1999 | Sizer et al. |
| 6,011,524 A | 1/2000 | Jervis |
| 6,069,564 A | 5/2000 | Hatano et al. |
| 6,075,501 A | 6/2000 | Kuramoto et al. |
| 6,118,379 A | 9/2000 | Kodukula et al. |
| 6,215,402 B1 | 4/2001 | Kodukula et al. |
| 6,253,190 B1 | 6/2001 | Sutherland |
| 6,360,138 B1 | 3/2002 | Coppola et al. |
| 6,373,448 B1 | 4/2002 | Chun |
| 6,369,438 B1 | 5/2002 | Seal |
| 6,552,661 B1 | 4/2003 | Lastinger |
| 6,601,764 B1 * | 8/2003 | Goodwin, III ................ 235/385 |
| 6,610,379 B1 | 8/2003 | Adams et al. |
| 6,669,089 B2 | 12/2003 | Cybulski et al. |
| 6,669,092 B2 | 12/2003 | Leanheart et al. |
| 6,693,539 B2 | 2/2004 | Bowers et al. |
| 6,693,541 B2 | 2/2004 | Egbert |
| 6,696,920 B1 | 2/2004 | Goodwin et al. |
| 6,715,675 B1 | 4/2004 | Rosenfeld |
| 6,736,316 B2 | 5/2004 | Neumark |
| 6,747,560 B2 | 6/2004 | Stevens |
| 6,749,116 B2 | 6/2004 | Massaro |
| 6,768,419 B2 | 7/2004 | Garber et al. |
| 6,784,850 B2 | 8/2004 | Morooka et al. |
| 6,796,508 B2 | 9/2004 | Muller |
| 6,824,065 B2 | 11/2004 | Boone et al. |
| 6,826,554 B2 | 11/2004 | Sone |
| 6,827,256 B2 | 12/2004 | Stobbe |
| 6,840,440 B2 | 1/2005 | Uozumi et al. |
| 6,843,415 B2 | 1/2005 | Vogler |
| 6,848,616 B2 | 2/2005 | Tsirline et al. |
| 6,867,747 B2 | 3/2005 | Price et al. |
| 6,897,827 B2 | 5/2005 | Semba et al. |
| 6,922,179 B2 | 7/2005 | McCollum |
| 6,943,688 B2 | 9/2005 | Chung et al. |
| 6,951,305 B2 | 10/2005 | Overhultz et al. |
| 6,956,538 B2 | 10/2005 | Moore |
| 7,151,505 B2 | 12/2006 | Jostell et al. |
| 7,570,151 B2 * | 8/2009 | Tuttle ........................... 340/10.6 |
| 2001/0045916 A1 | 11/2001 | Noro et al. |
| 2002/0008632 A1 | 1/2002 | Clothier |
| 2002/0011967 A1 | 1/2002 | Goff et al. |
| 2002/0018026 A1 * | 2/2002 | Noro ............................. 343/895 |
| 2002/0149539 A1 * | 10/2002 | Noro et al. ..................... 343/895 |
| 2002/0175805 A9 * | 11/2002 | Armstrong et al. ........ 340/10.31 |
| 2002/0190845 A1 | 12/2002 | Noore |
| 2003/0016185 A1 | 1/2003 | Morooka et al. |
| 2003/0097302 A1 | 5/2003 | Overhultz et al. |
| 2003/0122685 A1 * | 7/2003 | Tuttle ...................... 340/825.49 |
| 2003/0156072 A1 | 8/2003 | Price et al. |
| 2003/0174099 A1 | 9/2003 | Bauer et al. |
| 2003/0209601 A1 | 11/2003 | Chung |
| 2004/0015417 A1 | 1/2004 | Youngman et al. |
| 2004/0056091 A1 * | 3/2004 | Overhultz et al. ............. 235/382 |
| 2004/0212500 A1 * | 10/2004 | Stilp ............................. 340/541 |
| 2005/0031278 A1 * | 2/2005 | Shi et al. ....................... 385/121 |
| 2005/0156806 A1 * | 7/2005 | Ohta et al. ..................... 343/834 |
| 2005/0237157 A1 | 10/2005 | Cooper et al. |
| 2005/0242950 A1 | 11/2005 | Lindsay et al. |
| 2005/0258955 A1 | 11/2005 | Gloekler et al. |
| 2005/0258966 A1 | 11/2005 | Wuan |
| 2005/0264468 A1 | 12/2005 | Yegin et al. |
| 2005/0280539 A1 | 12/2005 | Pettus |
| 2006/0139172 A1 | 6/2006 | Waldner et al. |
| 2006/0208080 A1 * | 9/2006 | Overhultz et al. ............. 235/451 |
| 2006/0255949 A1 | 11/2006 | Roeder et al. |
| 2006/0273900 A1 | 12/2006 | Posamentier |
| 2007/0001809 A1 * | 1/2007 | Kodukula et al. ............. 340/10.1 |
| 2007/0085751 A1 | 4/2007 | Kai et al. |
| 2007/0146230 A1 | 6/2007 | Overhultz et al. |
| 2007/0176839 A1 | 8/2007 | Kai et al. |
| 2007/0279311 A1 | 12/2007 | Kai et al. |
| 2008/0055043 A1 | 3/2008 | Webb et al. |
| 2008/0231456 A1 * | 9/2008 | Matityaho .................. 340/572.7 |
| 2008/0258876 A1 * | 10/2008 | Overhultz et al. ............. 340/10.2 |
| 2009/0278688 A1 * | 11/2009 | Tuttle ......................... 340/572.2 |
| 2010/0039228 A1 * | 2/2010 | Sadr et al. .................... 340/10.1 |

* cited by examiner

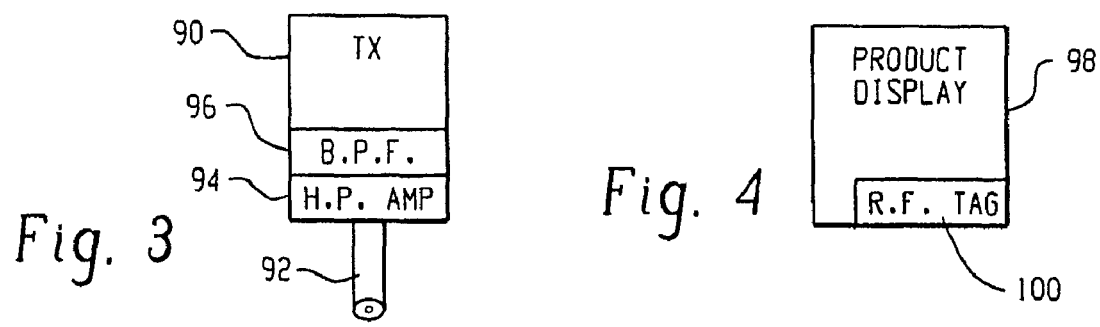
Fig. 3
Fig. 4
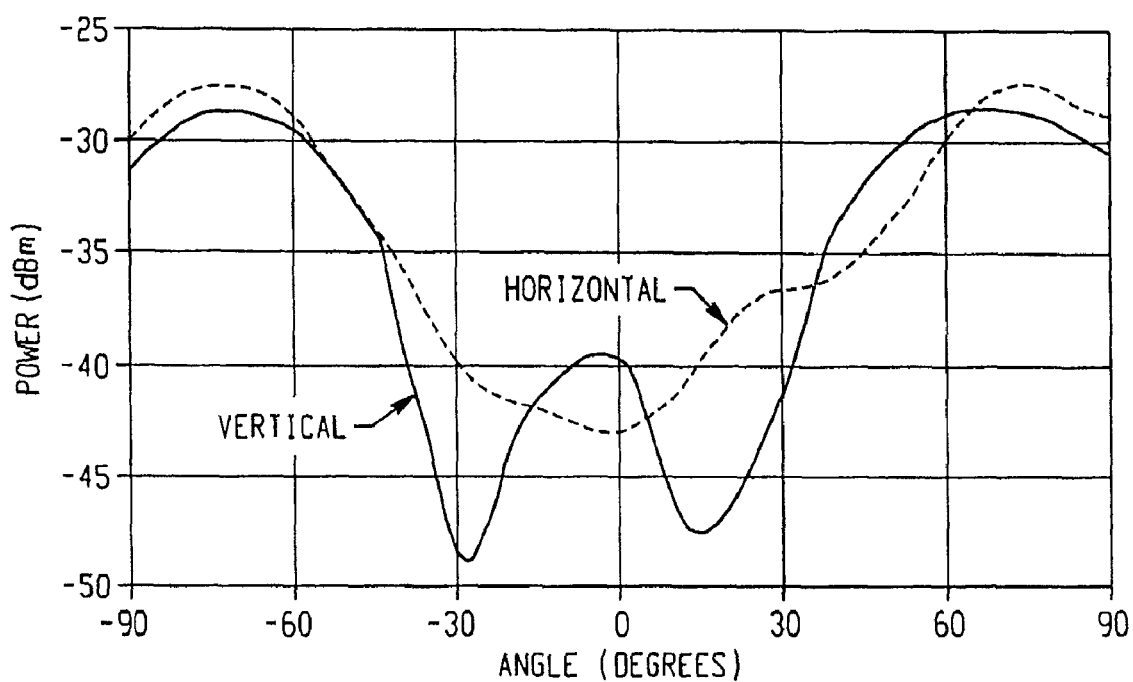
Fig. 5
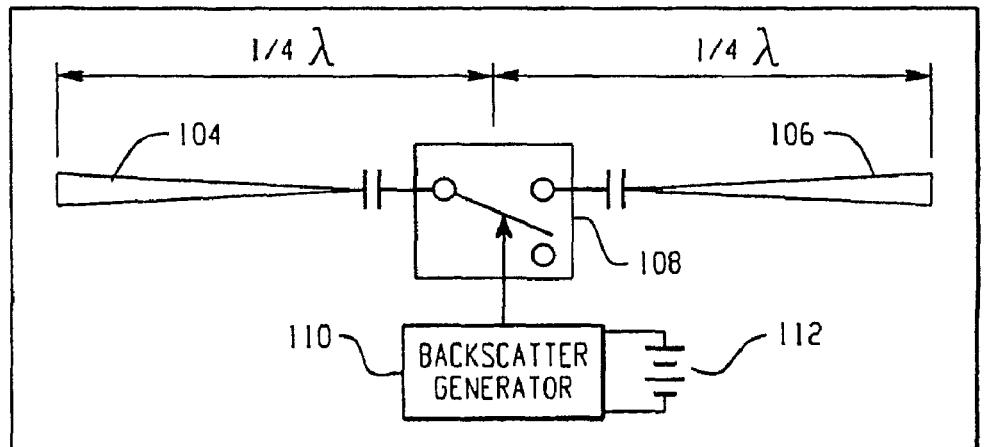
Fig. 6

DISTRIBUTED ANTENNA ARRAY WITH CENTRALIZED DATA HUB FOR DETERMINING PRESENCE AND LOCATION OF RF TAGS

CROSS-REFERENCE TO RELATED APPLICATIONS

This application is a continuation of U.S. application Ser. No. 11/417,768, filed on May 4, 2006 now U.S. Pat. No. 7,614,556, which is a continuation-in-part of International Patent Application No. PCT/US05/37138, filed on Oct. 18, 2005, which claims priority from U.S. Provisional Application No. 60/625,273, filed on Nov. 5, 2004. These prior applications are incorporated herein by reference in their entirety.

FIELD

The technology described in this patent document relates generally to a system and method of monitoring compliance with a Point of Purchase (POP) advertising program that displays one or more advertising signs or marketing materials and, specifically, to an improved method and system for monitoring or and exposure to advertising sings or marketing materials displayed at gas stations, convenience stores, grocery stores, mass merchandising outlets, drug stores, specialty retail outlets, consumer electronic stores, and the like. The improved method and system utilizes a Distributed Antenna Array with a Centralized Data Transmitter/Reader for Determining Presence and Location of RF Tags. The improved method and system also utilizes a Switched Backscatter Tag that cleanly switches on and off a resonant aperture to greatly increase the ratio of a reflected "mark" versus "space" in the received backscatter data.

BACKGROUND

The RFID system described herein is related to the inventions described in commonly assigned U.S. Patent Application Pub. No. 2004/0056091, which is incorporated herein by reference in its entirety. In that patent application, it was pointed out that a need exists for an advertising compliance monitoring system that provides versatility and flexibility by providing an RFID tag, associated with a specific sign or product display, that communicates tag data to an external reader.

U.S. Patent Application Pub. No. 2004/0056091 describes an RFID system that may include RFID tags of various types (e.g., passive, semi-passive or active), backscatter reader transmitters (BRT), and hubs. Typically, each BRT is a fully self-contained, battery operated unit, and utilizes three antennas. Two medium-gain patch antennas are used to read the tags, and a whip antenna is used to report the received data over a wireless link to the hub. This system functions well and is capable of detecting and reporting tags in a variety of retail environments and at different frequencies. It is desirable, however, to provide an even more economical RFID system by centralizing some or all of the electronics that have been distributed across areas or sub-areas in a given facility, thereby reducing redundancy and cost. It is also desirable to increase the read range of tags by the system to reduce the number of antennas required and to increase the reliability of tags being read under marginal conditions.

SUMMARY

The present invention modifies the prior approach to detecting and reporting presence and location of Radio Frequency (RF) tags across selected zones in retail stores, centralizing the RF transmission and receiving function and means to greatly reduce the expense of recurring components. In this approach, a single BRT/hub (called a "Spider") with antennas attached to multiple transmit and receive ports is used to cover a designated area of a facility, such as drug, grocery, or mass merchandise stores that sell products to consumers and display signage and other advertising material. In small outlets such as a drug store, a single BRT/hub could cover the entire store as the designated area. The "Spider" can be connected to AC power to eliminate cost and maintenance of batteries, as well as allowing more read cycles, if desired. This would also permit higher wattage to be used in the transmit function, potentially increasing the size and reliability of detection zones.

Thus, the use of multiple transmitting antennas and a large number of receiving antennas coupled to the reader enables a single Spider to detect tags in an even larger number of zones or designated areas.

In a small facility, the entire facility can be a designated area and one Spider can detect and reports all tags in the designated area (the entire facility).

In a larger facility, the facility can be divided into multiple designated areas with a plurality of sub-areas forming each of the designated areas. A plurality of display signs and the like are located in each of the sub-areas. Each display sign has an RF tag associated therewith. A single backscatter reader/transmitter (BRT) is placed in each designated area to form the "Spider". The "Web" of antennas in the designated area includes a distributed antenna array that comprises at least one transmitting antenna in or near each designated area that is electronically coupled to the single Spider and positioned to illuminate at least a portion of the plurality of RF tags in each designated area, and also has a single RF signal receiving antenna positioned in each sub-area to receive data from each of the RF tags in the sub-area that have been illuminated by the at least one transmitting antenna and then transfers that data to the single hub for processing. A single transmitting antenna may illuminate tags in a plurality of sub-areas, each containing their own RF receiving antenna.

A novel Switched Backscatter Tag (SBT) is preferably used as the RFID tag. It has a unique antenna that can be switched to change the wavelength of the antenna to cause relatively poor or relatively good reception properties.

Thus, it is an object of the present invention to provide a distributed antenna array with a centralized reader for determining the presence and location of RF tags in a designated area or sub-areas thereof.

It is also an object of the present invention to utilize a plurality of the distributed antenna systems in large facilities wherein the facility is subdivided into designated areas and each designated area has its own distributed antenna array with a centralized reader/transmitter for determining the presence and location of RF tags in sub-areas of each designated area.

It is also an object of the present invention to utilize a Switched Backscatter Tag (SBT) as the RFID tag to provide a dramatic improvement in the ability of the BRT to track the modulated signal containing the RFID tag data across greater distances than can be obtained with traditional RFID tags.

It is another object of the present invention to provide a master hub for receiving tag data from a plurality of centralized reader/transmitters in a plurality of designated areas and conveying that data to a remote server that processes data from a plurality of facilities.

Thus, the present invention relates to a distributed antenna array with a centralized data reader/transmitter for determining presence and location of RF tags comprising at least one designated area in a selected facility, a plurality of sub-areas in each of the designated areas, a plurality of RF tags in each sub-area, each of the tags being associated with a particular object in the sub-area that is to be monitored, a single backscatter reader/transmitter in each designated area, and a distributed antenna array comprising at least one transmitting antenna electronically coupled to the single reader and positioned to illuminate at least a portion of the plurality of the RF tags in each designated area with a signal, and a single RF signal antenna in each sub-area, and each of the single RF signal antennas in each sub-area receiving data from each of the RF tags in the respective sub-area that has been illuminated by the at least one transmitting antenna and transferring the received tag data to the single hub for transmission back to a remote server that processes data from a plurality of facilities.

The invention also relates to a method of determining presence and location of RF tags using a distributed antenna array with a centralized data reader/transmitter comprising the steps of selecting at least one designated area in a particular facility; selecting a plurality of sub-areas in each of the designated areas; placing a plurality of RF tags in each sub-area, each of the RF tags being associated with a particular object in the sub-area; forming a "Spider" in each sub-area with a single backscatter reader/transmitter; and forming a distributed antenna array ("Web") comprising the steps of positioning at least one transmitting antenna in or near the designated area to illuminate at least a portion of the plurality of the RF tags in the sub-area with a signal; the sub-area having at least one RF signal transmitting antenna being electronically coupled to the single reader; and placing a single RF signal receiving antenna in each sub-area; and receiving data from each of the RF tags in each sub-area that have been illuminated by the at least one transmitting antenna with the single RF signal receiving antenna and transferring the received tag data to the single hub for data transmission to a remote server that processes data from a plurality of facilities. The signal may comprise communication data, depending upon the type of tag used.

The invention further relates to a Switched Backscatter Tag (SBT) for communicating with a BRT comprising an antenna with each side having in one disclosed embodiment a ¼λ (i.e., ¼ wavelength) antenna element, a switch coupled to one of the ¼λ elements for selectively closing and connecting both antenna elements together to form a ½λ antenna that reflects the BRT carrier and for opening to create a ¼λ antenna that absorbs at least some of the BRT carrier, and a backscatter frequency generator coupled to the switch for opening and closing the switch cleanly.

BRIEF DESCRIPTION OF THE DRAWINGS

FIG. 3 depicts an example RF transmitter with a high power amplifier and a band-pass filter.

FIG. 4 depicts an object having an RFID tag associated therewith.

FIG. 5 is a graph illustrating example quadrifiler helix antenna gain patterns to show that the antenna has a low gain on the axis and a high gain on the sides.

FIG. 6 depicts an example switched backscatter tag (SBT) illustrating the manner in which the switch is opened and closed to accept or reject a BRT carrier signal.

DETAILED DESCRIPTION

Figure 1:
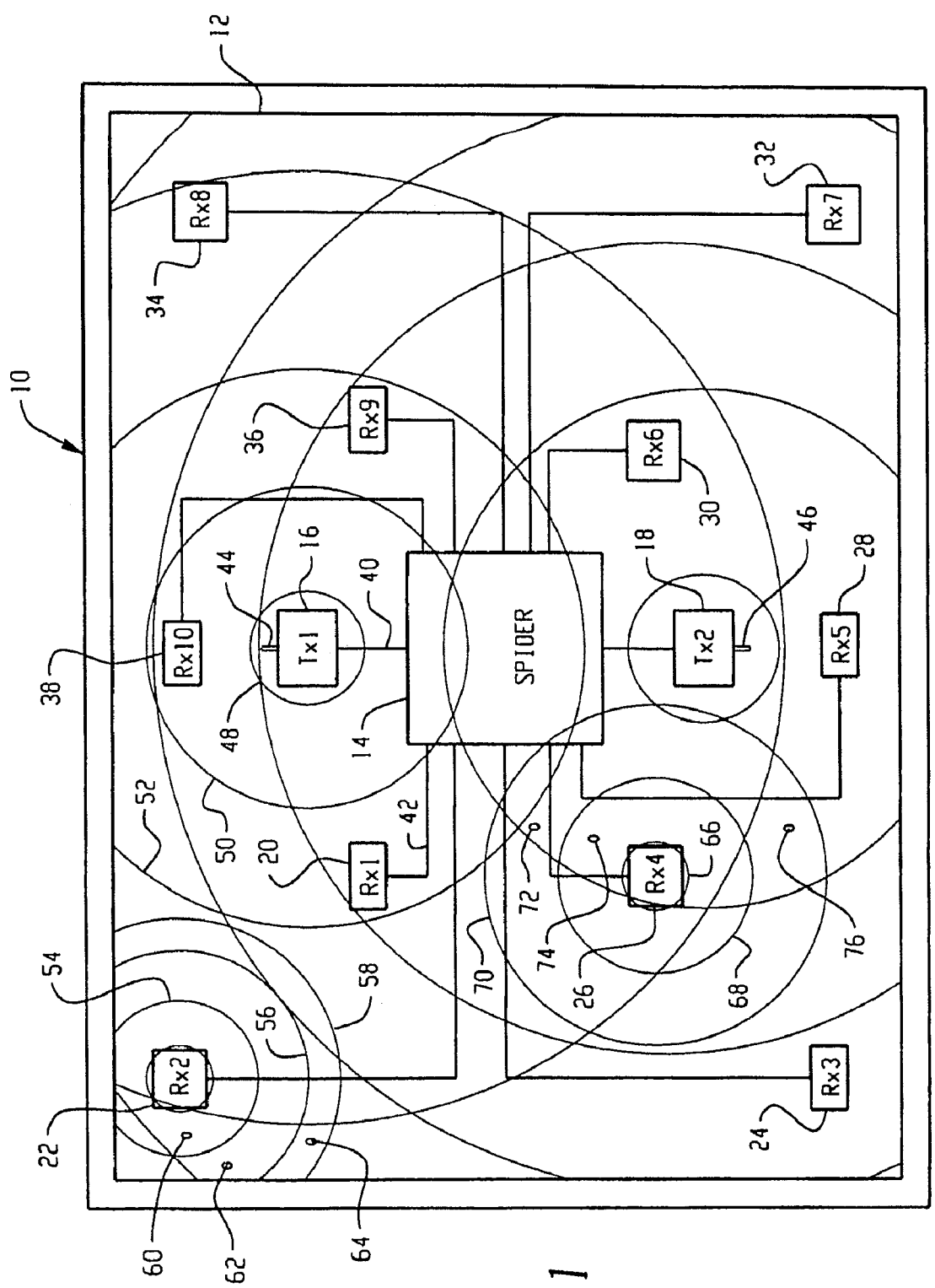
FIG. 1 depicts an example RFID system that includes a BRT hub that covers a designated area such as an entire commercial sales facility.

FIG. 1 depicts an example RFID system that includes a backscatter reader/transmitter (BRT) hub (called a "Spider") that covers a designated area of a facility. The RFID system may, for example, be used to detect and report the presence and location of radio frequency (RF) tags across selected zones in a retail environment. The RFID system may also be used to centralize RF transmission and receiving functions to reduce the expense of recurring components. A single BRT hub ("Spider") may be used that includes antennas attached to multiple transmit and receive ports to cover a designated area of a facility. In small facilities, a single BRT hub may be used to cover the entire facility as the designated area. The Spider may, for example, be connected to AC power to eliminate the cost and maintenance of batteries, as well as allowing more read cycles, if desired. This also may permit higher wattage to be used in the transmit function, potentially increasing the size and reliability of detection zones.

In FIG. 1, a small facility 10 is shown in which the designated area 12 to be covered by a BRT hub 14 includes the entire facility. The BRT hub 14 is coupled to a plurality of transmitters (TX 1, 2) 16-18 and a plurality of receivers (RX 1-10) 20-38, for example using coaxial cable. The plurality of receivers 20-38 are positioned to provide coverage of the entire designated area 12 (the entire facility 10). Preferably, only one TX and one RX are active at a time. It will be noted that RX 22 is able to receive data from RFID tags 60, 62, and 64 at different distances in the sub-area covered by RX 22, as illustrated by concentric circles 54, 56, and 58. Also it will be noted that the transmitter TX 16 has concentric rings 48, 50, and 52 that illustrate the transmitter-to-tag zones covered by the range of transmitter TX 16, thus showing that the transmitting antenna TX 16 is positioned to illuminate at least a portion of the RFID tags (in the RX zones covered by RX 20, 22, 26, 30, 34, 36, and 38) in the designated area. In like manner, TX 18 shows corresponding concentric rings illustrating illumination coverage ranges and representing transmitter-to-tag zones covering at least a portion of the RFID tags. Between the two transmitters TX 16 and 18, all of the RFID tags in the designated area (the facility 12) are capable of illumination.

Each of the transmitters TX 16 and 18 is coupled to the BRT hub 14, for example with coaxial cable. In like manner, each of the receiver antennas in each sub-area is coupled to the BRT hub 14, for example using coaxial cable. Of course, wireless connections, or other well-known types of connections could be used instead of coaxial cable.

When the transmitting antenna 16 illuminates RFID tags within its range, one of the RF signal receiving antennas, such as RX 22, receives the modulated tag signals and conveys them to the BRT hub 14 over coaxial cable (such as 42) for transmission to a remote server. A modulated RFID tag signal may be received by more than one RX antenna when read sequentially (for example RX 26 and RX 28). In such cases, the BRT hub (Spider 14) may forward both RX events to the server, and may ascertain a location within a store using closest zone readings, received signal strength indicator (RSSI) readings, antenna intersection, or other algorithms.

The transmitting antennas 44 and 46 associated with respective transmitters TX 16 and 18 should be omni-directional in order to illuminate tags over a large area. A shaped beam with low gain on axis and a high gain to the sides is ideal. For example, a quadrifiler helix antenna, as illustrated in FIGS. 7 and 8, may be used for the transmitting antennas 44 and 46. Quadrifiler helix antennas have been the choice in orbiting spacecraft communications for years. A quadrifiler helix antenna has circular polarization and a shaped beam for high gain when the spacecraft is farthest away on the earth's horizon, and low gain when the spacecraft is closest or overhead. Also, when used in an RFID system as described herein, the low profile of an quadrifiler antenna is equally advantageous. To a consumer or other observer in the facility, a quadrifiler helix antenna will typically look like a small white paper towel tube that hangs down a few inches vertically from the ceiling.

Typically, the transmit beam gain from TX 16 to RX 38 would be lower than the transmit beam gain from TX 16 to RX 22. Quadrifiler helix antennas are range compensating. The gain of the antenna is higher for objects farther away, which compensates for free-space power loss due to distance. This is illustrated in FIG. 5 which shows power vs. antenna angle. Higher power levels (gain) at 70 degrees are offset by the bore sight of the antenna.

Further, quadrifiler helix antennas are typically inexpensive. The antennas 44 and 46 shown in FIG. 1, for example, may be constructed of materials, such as PVC piping, #12 copper wire, and a small circuit card to maintain proper phasing between the elements. This type of antenna has been experimentally tested in a retail environment with very successful results.

Under FCC rules, part 15, a conducted RF output power of 1 Watt is allowed. The BRT's that are used in the system disclosed in commonly assigned U.S. Patent Application Publication No. 2004/0056091 are battery powered and have a maximum output power of 200 mW to conserve battery life while "illuminating" tags (e.g., reflect and receive backscatter modulated signals produced by the tags). Increasing conducted transmitter power will illuminate tags in a larger area and better illuminate tags marginally located in existing zones. The use of the quadrifiler helix antenna enables a gain of approximately 6 dbic translating into an effective isotropic radiated power (EIRP) of +36 dBm or 4 W. This is an increase of approximately 9 dB over the BRT patch antenna disclosed in the above identified published and commonly assigned co-pending patent application. This translates into an increase of 8 times the power.

The performance of an RF reader may be affected by transmitter power being coupled into the BRT receiver through the receiver antenna. The backscattered signal from the RFID tag is extremely small, and its detection can easily be overwhelmed by the backscatter transmitter carrier wave signal. Therefore, the separation of the TX antenna and the RX antenna, as shown in FIG. 1, improves performance because the deployment system allows for excellent separation.

Also, the use of the switched backscatter RFID tag (SBT) 102 shown in FIG. 6 also improves the signal communications between the SBT and the BRT. In one example, the SBT 102 has an antenna in which each side 104 and 106 of the antenna is approximately ¼λ (i.e., ¼ wavelength). In the case of a 915 MHz tag, each side is about 3.2 inches long. For a 2.45 GHz tag, these lengths would be approximately 1.2 inches long. Thus, for different frequencies the antenna lengths also would be different. A backscatter generator 110 produces a sub-carrier frequency that contains data, such as a tag ID. This backscatter signal opens and closes the RF switch 108 that connects the resonant ¼λ antenna elements 104 and 106. When the switch 108 is in the closed position, the antenna acts as a ½λ element, which is not a good receiver, and that reflects a higher percentage of the reader carrier frequency back to the reader.

When the switch 108 is in the open position, as shown, each antenna side is ¼ of the wavelength of the carrier frequency, which makes it a good receiver, and therefore absorbs more of the reader carrier frequency so it is not reflected back to the reader. This combination results in a substantial increase in the ratio of a "mark" (a 1 in binary state monitoring) to "space" (a 0 in binary state monitoring) signal received by the BRT. The increased ratio results in a dramatic improvement in the reader's ability to track the modulated signal containing the tag data across much larger distances. It also allows tags to be read more easily under marginal conditions, such as when they are close to liquid or metal (conditions well known in the art to be quite challenging for tags in the UHF band). In one example, the tag has improved performance because the antenna is T-shaped, with the antenna elements across the top of the tag, pointing out and away from other circuitry on the printed circuit board. This increases the effectiveness of the available frequency aperture and reduces antenna de-tuning.

The clean switching between "on" and "off" of a resonant aperture increases the mark-to-space ratio of the backscatter data as received by the BRT. It is this increased ratio that improves the BRT's ability to detect tags in a specific area of the store area being monitored using a carrier frequency, thereby allowing tags with a cleanly-switched resonant aperture to be detected at a much greater distance than tags without a cleanly-switched resonant aperture.

The system shown in FIG. 1 is well-suited for a small commercial sales establishment, such as a drug store, but a single Spider would likely be insufficient for larger-format retailers, such as grocery or mass merchandiser outlets. In such cases, several Spiders, each with separate Webs, could be used to cover the establishment. Connectivity to phone lines and redundant external communication electronics across multiple Spiders in a store could be circumvented by centralizing those functions into one master Spider 84. Such a system is shown in FIG. 2.

Figure 2:
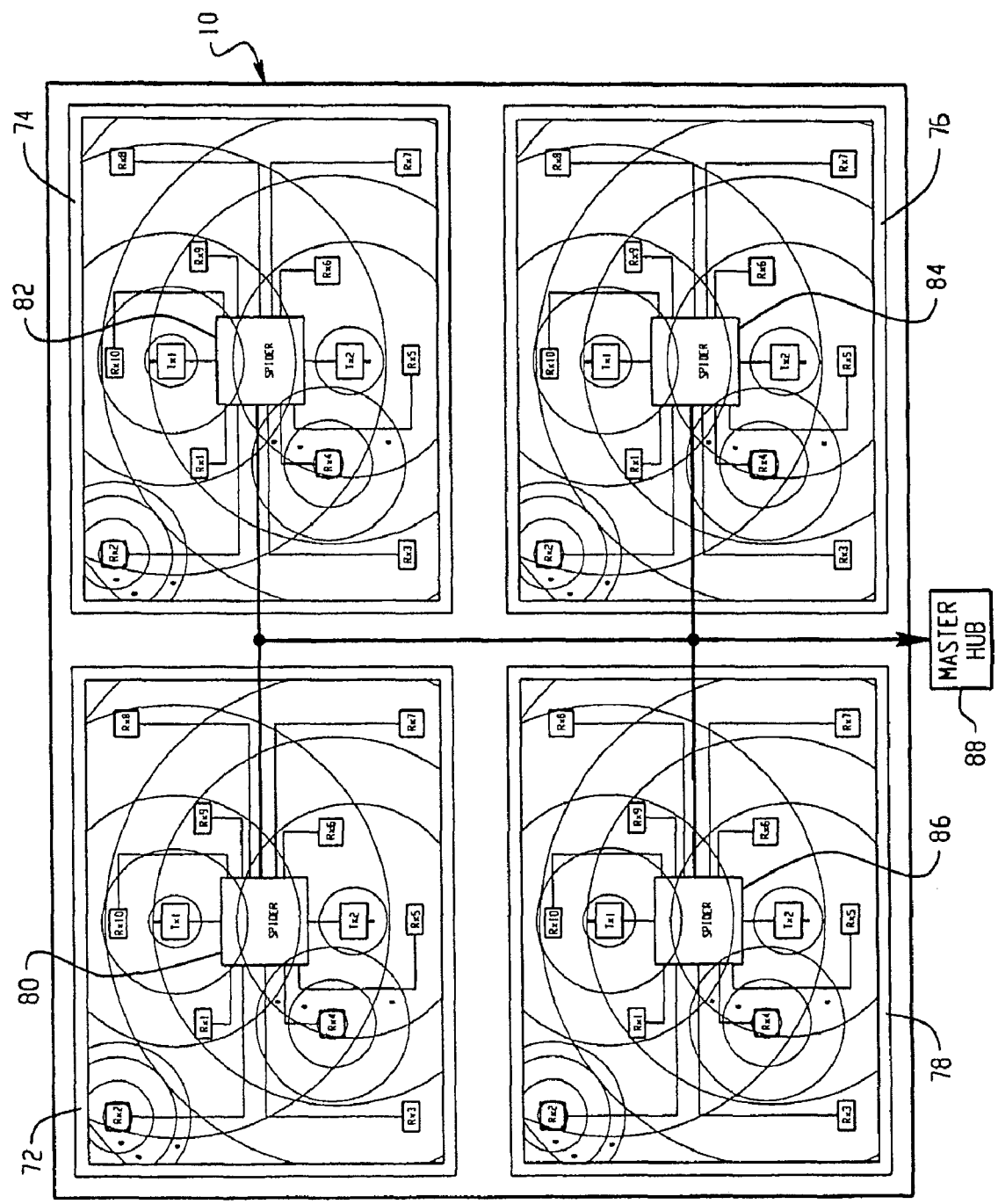
FIG. 2 depicts an example RFID system that includes a plurality of BRT hubs that are used in a plurality of designated areas to cover a larger facility.

Note in FIG. 2 that the selected location, or retail sales facility 10, is too large for one Spider. Therefore, in this example, four designated areas 72, 74, 76, and 78 are used to cover the entire facility 10. Each of the systems in each of the designated areas 72-78 is identical to the system shown in FIG. 1 and operates in an identical manner as described above. However, each of the Spiders 80, 82, 84, and 86 could be electronically coupled to a master hub 88 as shown.

Multiple Web antennae are connected to a single backscatter transmitter/receiver in the Spider, for example through coaxial cables. These coaxial cables pass through a switch matrix. This matrix and the long coaxial cables combine to create additional attenuation, thereby lowering the received signal level. To overcome this loss, a low noise amplifier (LNA) is positioned at each RX antenna. These amplifiers draw small amount of current (≈15 mA) through the coaxial cable using bias tees. Locations in retail environments that are difficult or expensive to monitor via coaxial cable, such as external fuel pump signage, could still be served by the previously-designed BRT's with distributed reader/transmitter electronics by forwarding their data wirelessly to the master Spider.

FIG. 3 is a block diagram of an example quadrifiler helix antenna 90. The antenna 90 is coupled to the Spider through a coaxial cable 92 and has an associated high power amplifier 94 to recover coaxial cable signal attenuation. The antenna 90 also has an associated ISM (Industrial, Scientific, and Medical) band pass filter 96 to reduce noise or harmonics.

FIG. 4 depicts an example object 98 having an RFID tag 100 associated therewith. The object may be a permanent display, Point of Purchase (POP) temporary display, signage, advertising material, stock-alert sensors, merchandising material, category section marker, individual product, or other material desired to be monitored by retailers, manufacturers, or point-of-sale producers (collectively a "display"). The object may also be a consumer (or movable object) to which an RFID tag is associated so that the shopping (movement) pattern of the consumer can be monitored. In this manner, consumer exposure to a given display may be tracked. An RFID tag given to a consumer may, for example, be a small active transmitter tag (ATT) that uses the same frequency and protocol as the reflection from the semi-passive backscatter tags.

Thus, there has been disclosed a distributed antenna array system with a centralized transmitter/reader hub for determining the presence and location of RF tags that substantially reduces the costs of installation and operation of such existing systems through the elimination of redundant components and batteries. Performance in the present novel system is improved through the addition of transmission power, the use of quadrafiler helix antennas, and elimination of the BRT-hub link. Independent control over each antenna's read periodicity and power provides additional fine-tuning capability for store nuances and monitoring of additional functions such as consumer exposure to displays or stock-alert sensors described elsewhere.

Further, there has been disclosed a novel Switched Backscatter RFID Tag (SBT) that uses an antenna with two $\frac{1}{4}\lambda$ elements that are connected by a switch that is either closed to create a single $\frac{1}{2}\lambda$ antenna that is not receptive to the reader signals, or is open to create $\frac{1}{4}\lambda$ antenna elements that are very good receptors of the reader signals. This SBT results in a significant increase in the "mark" to "space" ratio detected by the reader, and causes dramatic improvement in the reader's ability to track the modulated signal containing the RFID tag data across much larger distances than previously available.

FIGS. 7-10 depict example circular polarized antenna configurations that may be used as transmitter and receiver antennas in an RFID system, as described herein. It has been determined that for both economic and performance reasons the optimal solution for the antennas in an RFID system is to use circular polarized antennas for the transmitters and receivers and to use linear polarized antennas for the RFID tags. The switched backscatter RFID tag (SBT), described herein, is one example of an RFID tag having a linear polarized antenna.

Using a linear polarized tag in an RFID system is typically more economical than using a tag with circular polarization. A linear polarized tag can typically be made smaller than a tag using circular polarization because a linear polarized antenna needs to operate in only one axis. However, from a system standpoint the radiation patterns of the antennas in the transmitter, receiver and tag should all be aligned or coplanar to achieve the most robust link and the best performance. This is most easily achieved in a retail environment using circular polarized antennas because maintaining coplanar antenna alignment between linear antennas in a retail environment is often impractical. A good compromise is the use of circular polarized antennas for the receivers and transmitters and linear polarized antennas for the RFID tags. In this manner, a high level of overall system performance may be maintained, while reducing the cost of the RFID tags.

Figure 7A:
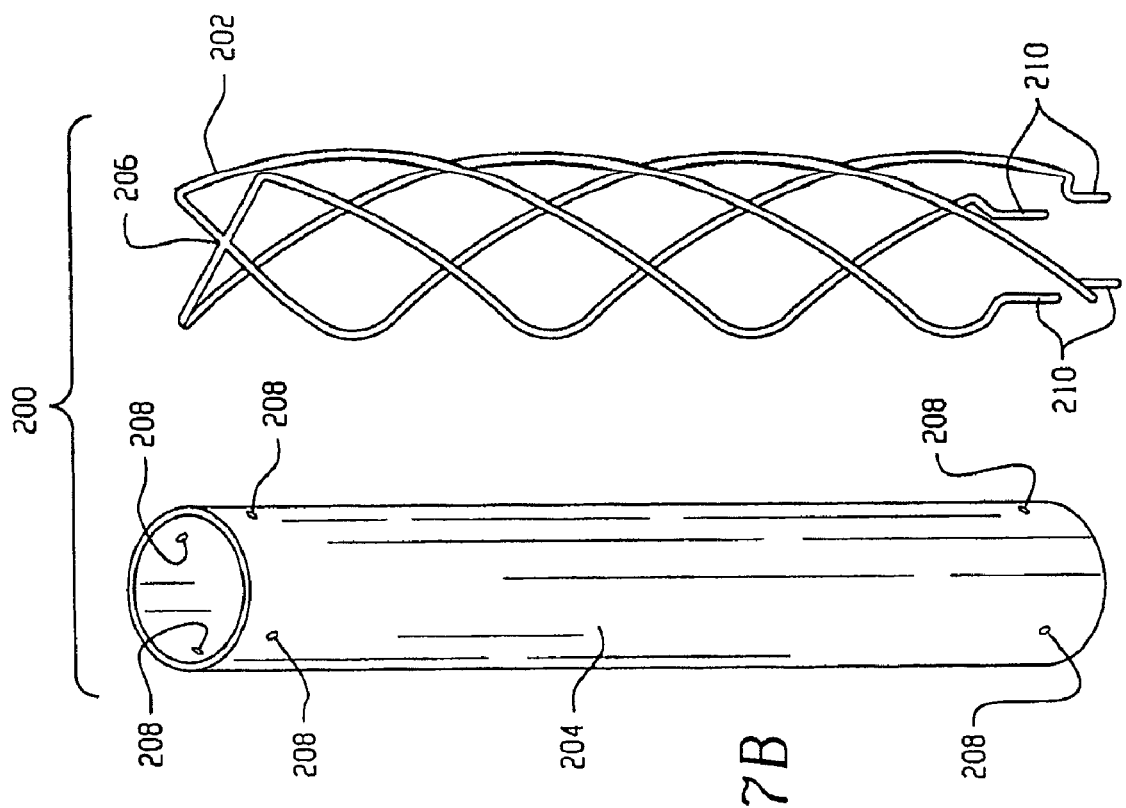
FIGS. 7A and 7B depict an example transmitter antenna having a circular polarized quadrifiler helix antenna element.
Figure 7B:
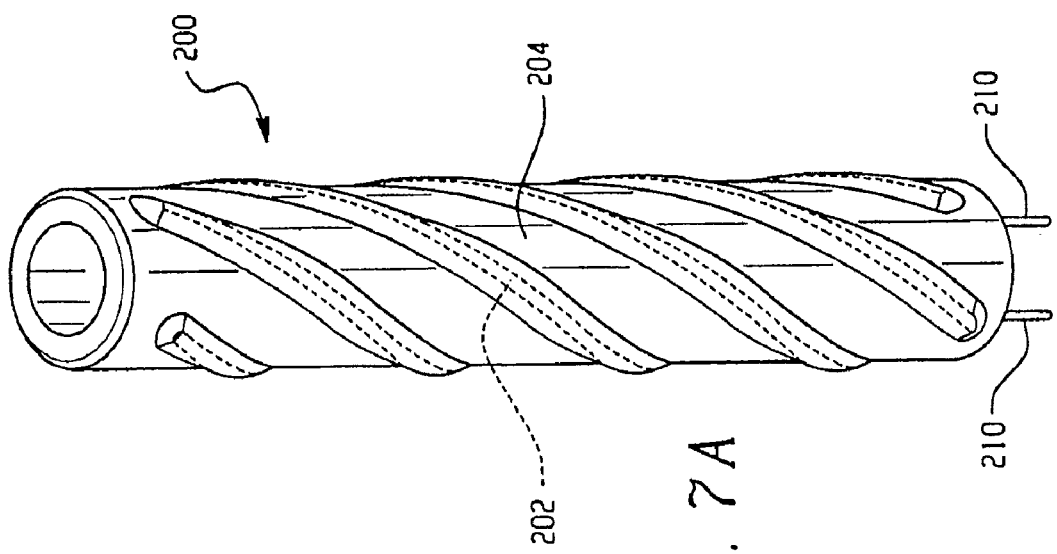
Figure 8:
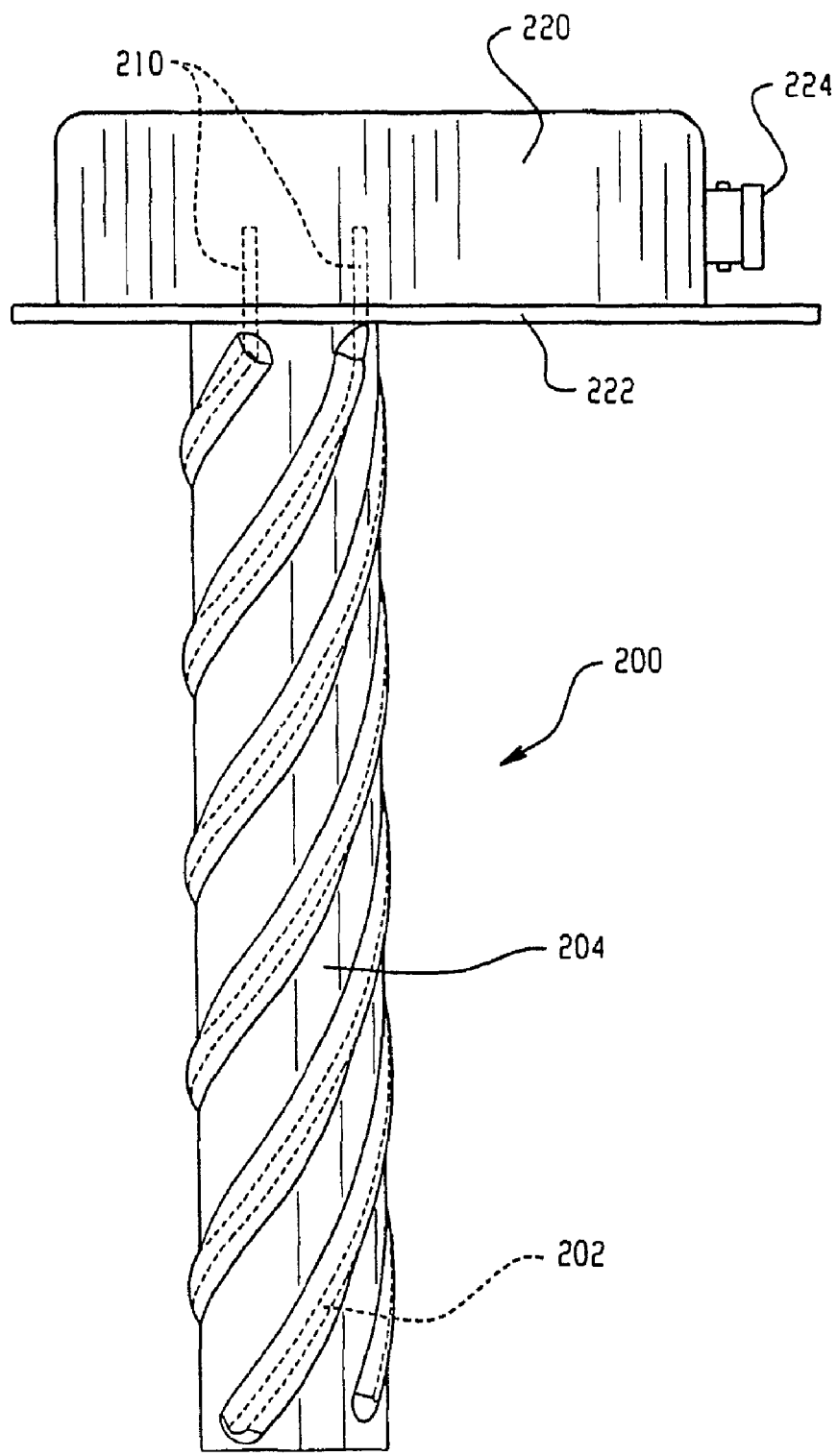
FIG. 8 depicts the example quadrifiler helix antenna attached to an amplifier circuit.

FIGS. 7A and 7B depict an example transmitter antenna 200 that includes a quadrifiler helix antenna element 202. FIG. 7A is a side view of the antenna structure 200 and FIG. 7B is an exploded view in which the antenna element 202 and dielectric core 204 are depicted separately. The dielectric core 204 is a cylindrical structure formed from a non-conducting material. The antenna element 202 includes four radiating arms that are joined at a common junction 206 and that extend from the common junction in a helical pattern. In one example, the antenna element 202 may be formed from two antenna wires that are joined at the common junction 206, for instance by soldering, and that are shaped to form the four radiating arms of the quadrifiler helix structure. In another example, the two wires forming the antenna element may be in physical contact, but not mechanically joined, at the common junction 206.

In the illustrated example, the antenna structure 202 is attached to the dielectric core 204 using a plurality of holes 208 in the dielectric core 204. As illustrated in FIG. 7A, the antenna structure 202 may be attached through the holes 208 in the dielectric core 204, such that the common junction 206 is within the cylinder of the core 204 and the spiral portions of the radiating arms extend through an upper set of holes 208 and along the outside of the dielectric core 204. The four radiating arms may also extend through a lower set of holes 208 such that the four end portions 210 of the radiating arms extend from inside of the dielectric core 204. In addition, the antenna element 202 may be further secured to the dielectric core 204, as well as protected from environmental conditions, by covering the radiating arms on the outside of the core 204 with a protective material, such as a heat shrink, as shown in FIG. 7A.

FIG. 8 depicts the example quadrifiler helix antenna 200 attached to an amplifier circuit 220. As illustrated, the end portions 210 of the antenna element 202 may extend through a dielectric material 222, such as a printed circuit board, to couple the antenna 202 to the amplifier circuit 220. The dielectric material 222 may also incorporate an antenna backplane (e.g., a metallic surface) to shield the antenna 202 from the amplifier circuit 220 and to provide directivity to the circular polarized radiation pattern of the helical antenna element 202.

The amplifier circuit 220 may, for example, be attached to the ceiling of a retail environment such that the antenna 200 extends downwardly from the ceiling. In addition, the amplifier circuit 220 may be coupled to other components in the RFID system via an external connector 224, such as a coaxial cable connector. In one example, the amplifier circuit 220 may include two or more gain settings that may be used to tune the amplifier circuit 220 for use in different sized retail environments. For example, a higher gain setting for the amplifier 220 may be used for a larger retail environment.

Figure 9B:
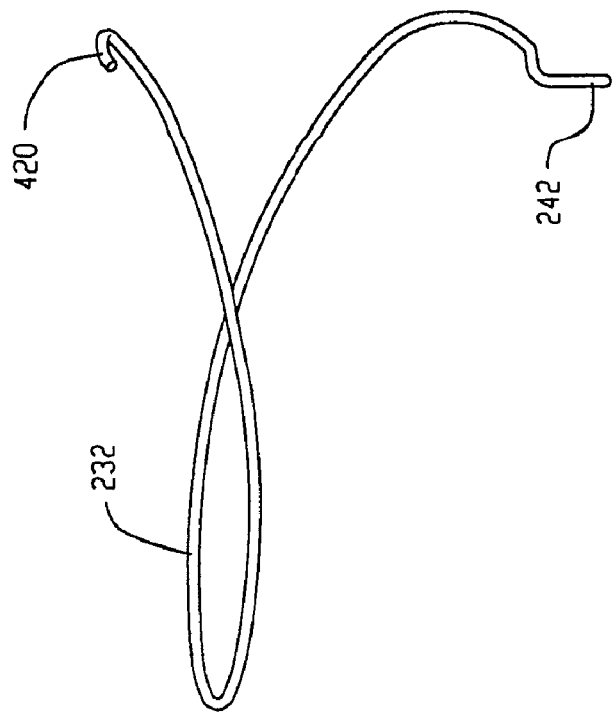
FIGS. 9A and 9B depict an example receiver antenna having a single turn helix antenna element.
Figure 9A:
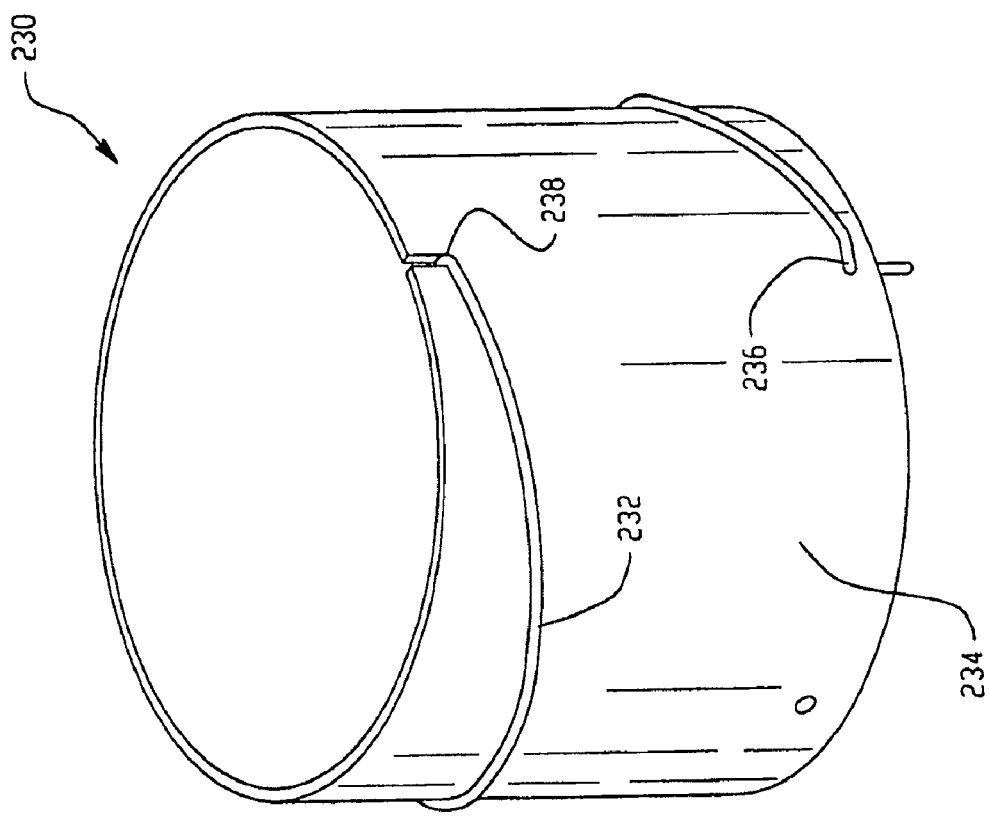

FIGS. 9A and 9B depict an example receiver antenna 230 that includes a single turn helix antenna element 232. FIG. 9A is a prospective view of the antenna structure 230 showing both the antenna element 232 and the dielectric core 234, and FIG. 9B shows only the antenna element 232. The dielectric core 234 is a cylindrical structure formed from a non-conducting material. In the illustrated example, the antenna element 232 is attached to the dielectric structure 234 using a hole 236 in a bottom portion of the dielectric core 234 and a slot 238 in an upper portion of the core 234. As illustrated in FIG. 9A, an upper end portion 240 of the antenna element 232 may extend trough the slot 238 and a lower end portion 242 of the antenna element 232 may extend through the hole 236, such that the spiral portion of the antenna element extends along the outside of the dielectric core 234.

Figure 10:
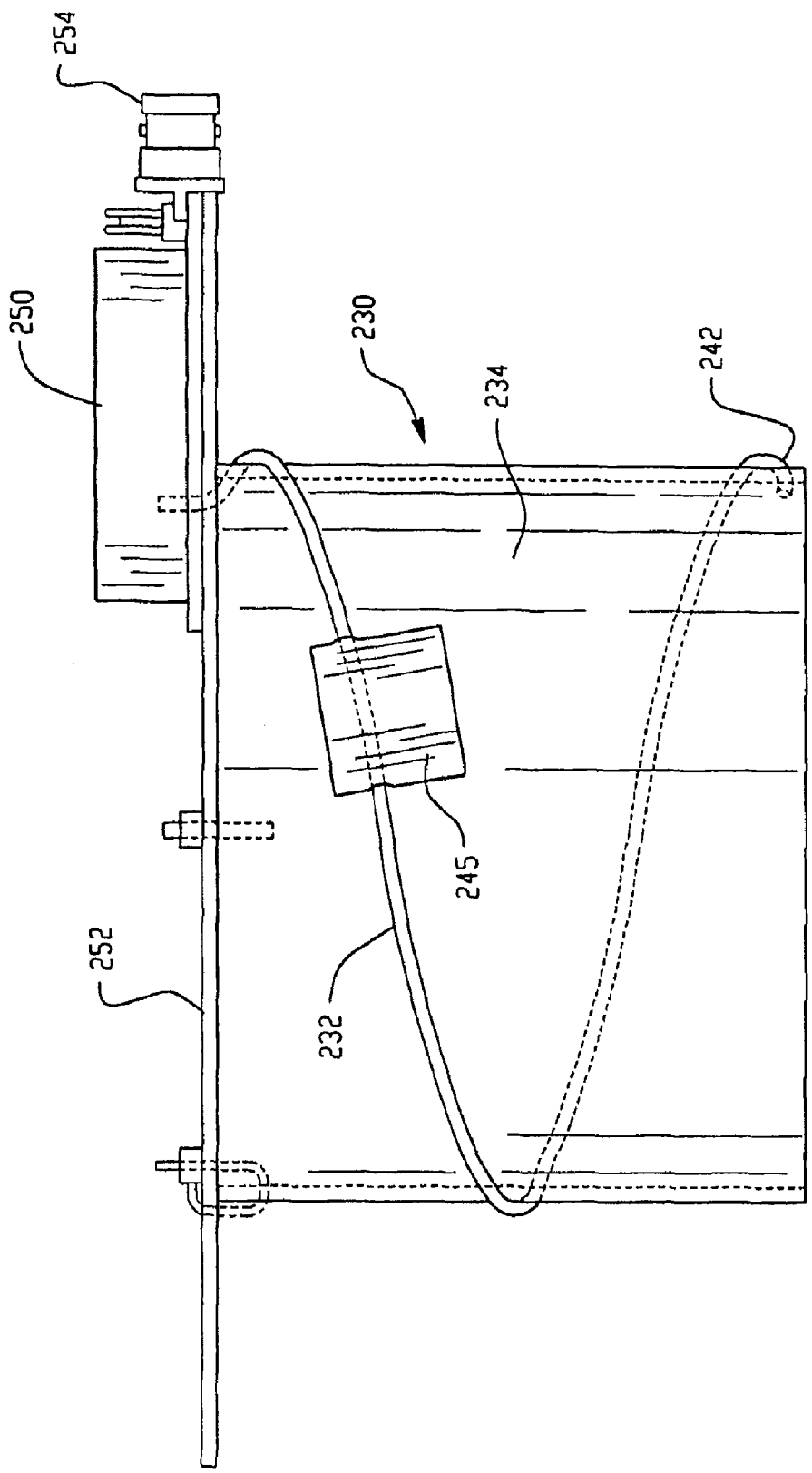
FIG. 10 depicts the example single turn helix antenna attached to an amplifier circuit.

FIG. 10 depicts the example single turn helix antenna 230 attached to an amplifier circuit 250. As illustrated, the lower end portion 242 of the antenna element 232 may extend through a dielectric material 252, such as a printed circuit board, to couple the antenna 232 to the amplifier circuit 250. The dielectric material 252 may also incorporate an antenna backplane (e.g., a metallic surface) to shield the antenna 232 from the amplifier circuit 250 and to provide directivity to the circular polarized radiation pattern of the helical antenna structure 232. FIG. 10 also illustrates a conductive patch 245 that may be included to tune the antenna and possibly to help adhere the antenna element 232 to the dielectric material 252. The element 232 may be adhered to the outside of the patch 245.

The amplifier circuit 250 may, for example, be located in the ceiling of a retail environment, for example above the ceiling tiles. In addition, the amplifier circuit 250 may be coupled to other components in the RFID system via an external connector 254, such as a coaxial cable connector.

Figure 11:
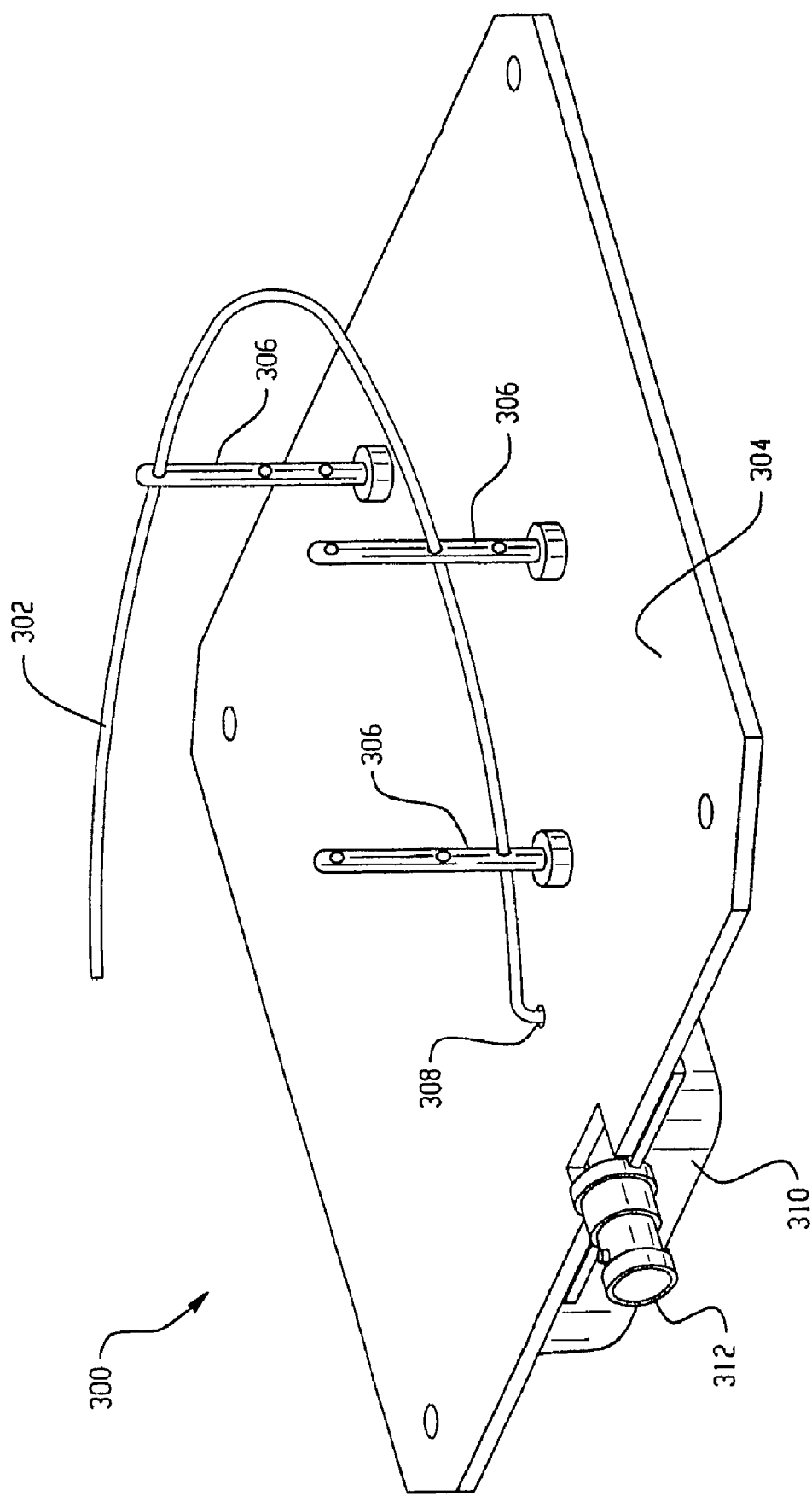
FIGS. 11-13 depict another receiver antenna embodiment that includes a single turn helix antenna element.

FIG. 11 depicts another preferred embodiment of receiver antenna 300 that includes a single turn helix antenna element 302. In this example, the antenna element 302 is not supported by a dielectric core. Rather, the antenna element 302 is attached to a dielectric material 304, such as a printed circuit board, using a plurality of support structures 306 made of a dielectric material, such as plastic. In addition, an end portion of the antenna element 302 is coupled to an amplifier circuit 310 through a hole 308 in the dielectric material 304. The dielectric material 304 may also incorporate an antenna backplane (e.g., a metallic surface) to shield the antenna element 302 from the amplifier circuit 310 and to provide directivity to the circular polarized radiation pattern of the helical antenna structure 302. Also illustrated is a connector 312, such as a coaxial cable connector, for coupling the amplifier circuit 310 to other components in the RFID system. In one example, the antenna element 302 may be about 1λ in length with a pitch of about 0.2λ. The openings 307 in the supports 306 serve to fix the pitch at the beginning portion of the element 302 at its critical beginning location.

Figure 12:
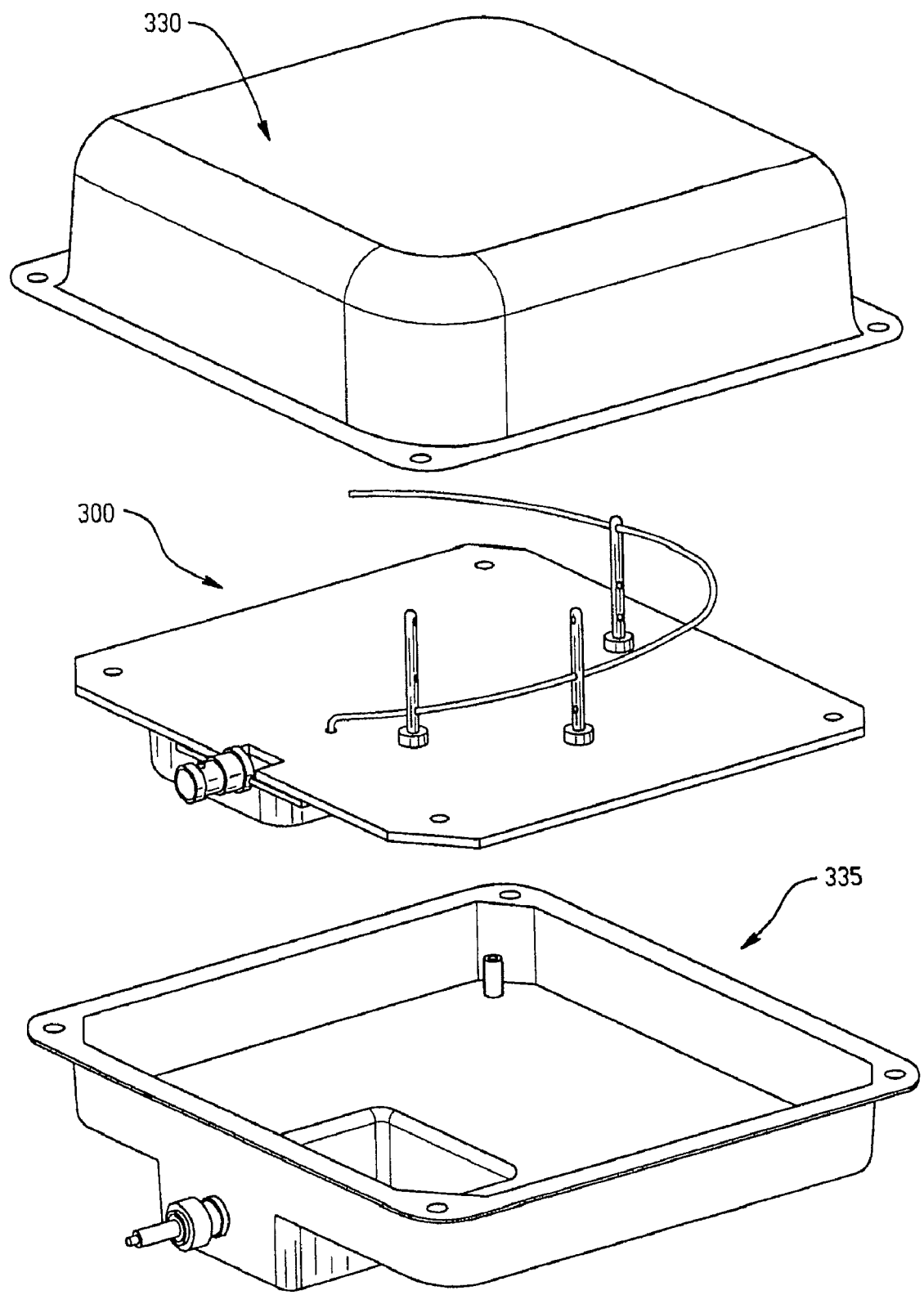
Figure 13:
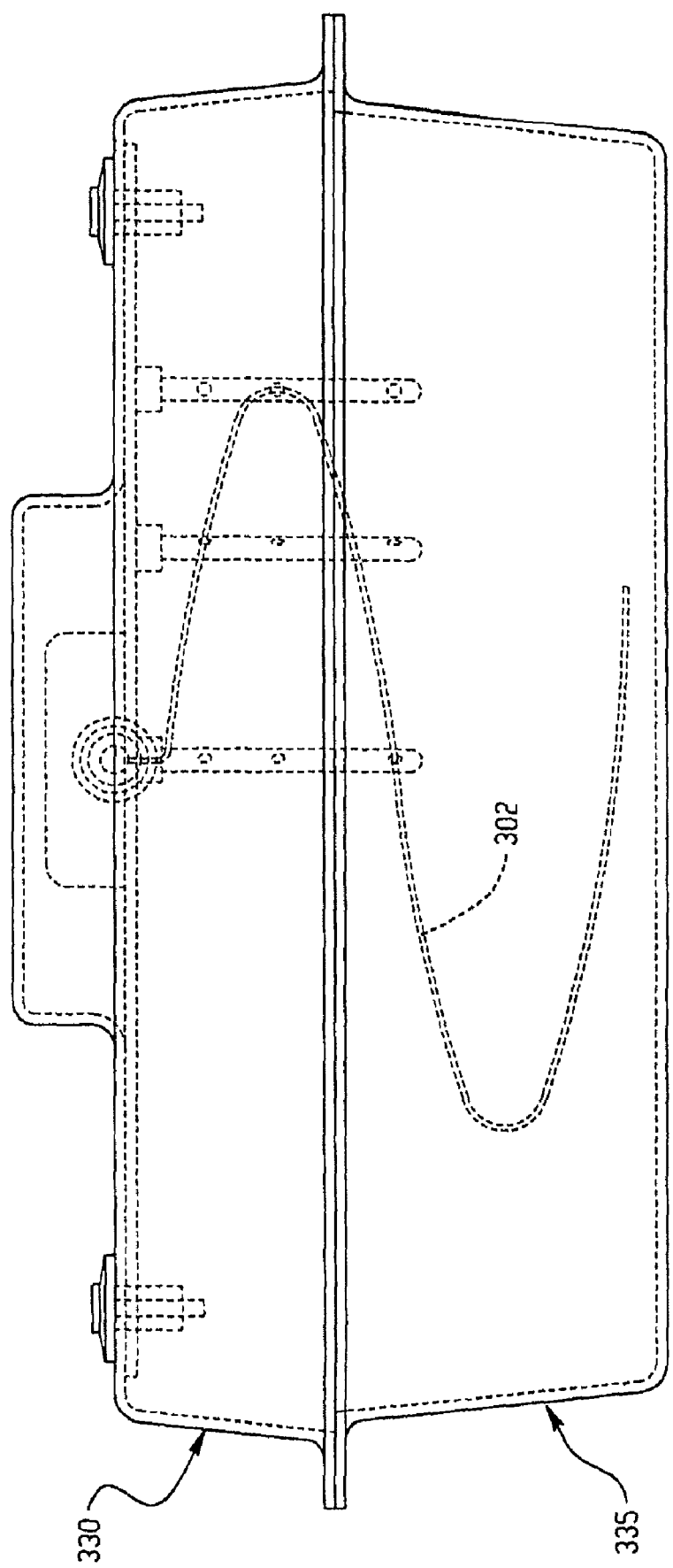

FIG. 12 is an exploded view of an example enclosure 330, 335 for housing the receiver antenna 300. The antenna housing 330, 335 may, for example, be secured in the ceiling of a retail environment, for example above the ceiling tiles. FIG. 13 shows how the antenna structure 302 fits within the housing portions 330, 335.

This written description uses examples to disclose the invention, including the best mode, and also to enable a person skilled in the art to make and use the invention. The patentable scope of the invention may include other examples that occur to those skilled in the art.

The invention claimed is:

1. A distributed antenna array system with a centralized data reader/transmitter for determining presence and location of linearly polarized RF tags comprising:
   at least one designated area in a facility;
   a plurality of sub-areas in each of the at least one designated area;
   a plurality of RF tags dispersed in each sub-area, wherein each of the tags is associated with a particular respective object present in the sub area;
   a single backscatter reader/transmitter (BRT) in each of the at least one designated area;
   and a distributed antenna array in the facility comprising:
   at least one transmitting antenna electronically coupled to the single BRT and positioned to interrogate at least a portion of the plurality of RF tags present in each sub-area with a carrier signal, wherein a single transmitting antenna is operable to interrogate a plurality of sub-areas;
   a single RF signal receiving antenna present in each sub-area;
   and each of the single RF signal receiving antennas present in each sub-area receiving data from each of the RF tags in the sub area that have been interrogated by the at least one transmitting antenna and transferring the received tag data to the BRT, wherein wherein each RF tag comprises an antenna with two ¼λ; a switch coupled to one of the ¼λ antennas element for selectively closing and connecting both antenna elements together to form a ½λ antenna that reflects the BRT carrier signal and for opening to create two ¼λ antenna elements that absorb at least some of the BRT carrier signal; and a backscatter frequency generator on the tag and coupled to the switch for selectively opening and closing the switch and generating tag data;
   and wherein a master BRT is coupled to and is operable to collect the received tag data from each of a plurality of interconnected BRTs and from its respective designated area, and wherein the collected and received tag data is processed to determine the presence and location of the RF tags in a particular facility.

2. The system of claim 1 wherein:
   the selected facility is a product sale facility; and
   the particular object associated with a tag is a product display, sign, merchandising or advertising material ("Display").

3. The system of claim 1 wherein the system determines that the Display is present in a sub-area in the facility where a person may see or interact with the Display.

4. The system of claim 1 wherein the system determines that the Display is properly installed in a particular location in the sub-area.

5. The system of claim 4 wherein the system determines that the Display is present in the particular location for an appropriate period of time.

6. The system of claim 1 wherein the RF tag is carried by a person in the facility to enable market testing through the use of data collected concerning the Displays in the particular locations visited by the person and the time spent in each particular location.

7. The system of claim 1 wherein the at least one transmitting antenna is a quadrafiler helix antenna having a shaped beam with low gain on axis and high gain to the sides.

8. The system of claim 1 wherein:
   each transmitting antenna is connected to the single backscatter reader/transmitter by a coaxial cable; and
   each transmitter antenna contains a high power amplifier to recover coaxial cable signal attenuation and a band-pass filter at the proper frequency to reduce noise and/or harmonics.

9. The system of claim 1 wherein the distributed antenna array comprises:
   a plurality of transmitting antennae, each of the transmitting antennae being located in or near the designated area to transmit communication signals to at least a portion of the RF tags located in at least some of the sub-areas.

10. The system of claim 1 further comprising: a plurality of designated areas in the facility; the single master BRT for interrogating RF tags in its corresponding sub area and also receiving RF tag data of the RF tags in each designated area from the BRTs of each designated area; and wherein a plurality of BRTs receive response signals from at least a portion of the interrogated tags and couple the response signals to the single master BRT that transmits the response signals to a server that processes the response signals.

11. The system of claim 1 wherein each RF tag comprises:
an antenna system with a resonant aperture; and
a switch coupled to one or more elements of the antenna system to cleanly connect and disconnect selected portions of one or more elements of the antenna system to greatly increase the mark-to-space ratio of the backscatter data.

12. A method for determining presence and location of RF tags using a distributed antenna array with a centralized data hub comprising the steps of:
selecting at least one designated area in a particular facility;
selecting a plurality of sub-areas in each of the designated areas;
placing a plurality of RF tags in each sub-area, each of the tags being associated with a particular object in the sub-area;
placing a single backscatter reader/transmitter (BRT) in each of the at least one designated areas;
and forming a distributed antenna array comprising the steps of:
positioning at least one transmitting antenna in or near the designated area to interrogate at least a portion of the plurality of RF tags in the sub-areas with communication data, wherein the transmitting antenna is electronically coupled to the single BRT, and wherein a single transmitting antenna is operable to interrogate a plurality of sub-areas;
placing a single RF signal receiving antenna in each sub area;
receiving data from each of the of the RF tags in each sub-area by interrogating by the at least one transmitting antenna;
transferring the received data to the BRT, wherein each RF tag comprises an antenna with two $\tfrac{1}{4}\lambda$; a switch coupled to one of the $\tfrac{1}{4}\lambda$ antennas element for selectively closing and connecting both antenna elements together to form a $\tfrac{1}{2}\lambda$ antenna that reflects the BRT carrier signal and for opening to create two $\tfrac{1}{4}\lambda$ antenna elements that absorb at least some of the BRT carrier signal; and a backscatter frequency generator on the tag and coupled to the switch for selectively opening and closing the switch and generating tag data;
and wherein a master BRT is coupled to and collects the received data from each of a plurality of interconnected BRTs and from its respective designated area, and wherein the collected and received data is processed to determine the presence and location of the RF tags in a particular facility.

* * * * *